United States Patent
Monnoyeur et al.

(10) Patent No.: US 6,176,577 B1
(45) Date of Patent: Jan. 23, 2001

(54) ASPHERIC LENSES

(75) Inventors: Guy Monnoyeur, Songeson (FR); Robert R. Zeidler, Charlton, MA (US)

(73) Assignee: Oracle Lens Manufacturing Corporation, Warwick, RI (US)

(*) Notice: Under 35 U.S.C. 154(b), the term of this patent shall be extended for 0 days.

(21) Appl. No.: 09/545,231

(22) Filed: Apr. 7, 2000

Related U.S. Application Data

(63) Continuation of application No. 09/173,524, filed on Oct. 15, 1998, now abandoned.

(51) Int. Cl.$^7$ .................................................. G02C 7/02
(52) U.S. Cl. ............................................ 351/159; 351/174
(58) Field of Search .................................. 351/159, 167, 351/174, 177, 178

(56) References Cited

U.S. PATENT DOCUMENTS

| | | |
|---|---|---|
| 3,434,781 | 3/1969 | Davis et al. . |
| 3,645,610 | 2/1972 | Duckwell et al. . |
| 3,877,798 | 4/1975 | Tolar et al. . |
| 3,960,442 | 6/1976 | Davis et al. . |
| 4,008,031 | 2/1977 | Weber . |
| 4,289,387 | 9/1981 | Jalie . |
| 4,310,225 | 1/1982 | Davis . |
| 4,664,854 | 5/1987 | Bakalar et al. . |
| 4,828,769 | 5/1989 | Maus et al. . |
| 4,867,553 | 9/1989 | Frieder . |
| 4,874,561 | 10/1989 | Spector . |
| 4,933,119 | 6/1990 | Weymouth . |
| 4,978,211 | 12/1990 | Cornu et al. . |
| 5,131,738 | 7/1992 | Bristol . |
| 5,235,357 | 8/1993 | Winthrop et al. . |
| 5,531,940 | 7/1996 | Gupta . |
| 5,859,685 | 1/1999 | Gupta et al. . |
| 5,861,934 | 1/1999 | Blum et al. . |

OTHER PUBLICATIONS

Jaile, "The Principles of Ophthalmic Lenses", The Association of British Dispensing Opticians, Fourth edition pp. 412–467, 1988.

Borish, "Clinical Refraction", The Professional Press, Inc., Chapter 26, pp. 1051–1059.

Dowaliby, "Practical Aspects of Ophthalmic Optics", Professional Press Books Fairchild Publications, Chapter 12, pp. 161–170.

Davis et al., "The Design of a General Purpose Single Vision Lens Series", Selected Papers of Special significance to Optometry, SPIE Milestone Series, vol. MS 62, pp. 128–152.

*Primary Examiner*—Scott J. Sugarman
(74) *Attorney, Agent, or Firm*—Fish & Richardson P.C.

(57) ABSTRACT

A series of positive-power aspheric ophthalmic lenses for correction of hypermetropia is described. A lens in the series is aspherically corrected on its anterior surface within an optically active region of diameter $D_1$ which is less than the lens diameter D. The optically active region is surrounded by a border region bounded by diameters $D_1$ and D, which can be constant for all dioptric powers. The border region can be matched to the optically active region in the region of $D_1$ such that the difference in anterior surface sag between $D_1$ and D may be made to be a constant for all dioptric powers. Lenses produced using this invention are thinner and lighter than prior-art lenses. Other advantages include predictable and constant edge thickness at diameter $D_1$, and enhanced productivity and yield in certain manufacturing processes.

51 Claims, 2 Drawing Sheets

ASPHERIC LENSES

CLAIM OF PRIORITY

This is a continuation of U.S. Ser. No. 09/173,524, filed on Oct. 15, 1998 now abandoned, the entire contents of which are hereby incorporated by reference.

BACKGROUND OF THE INVENTION

This invention relates to ophthalmic spectacle lenses for distance vision correction.

Prescriptive ophthalmic lenses used for the correction of hypermetropia are positively-powered lenses, thicker at the center than at the edge. When conventional spherical ophthalmic lenses used for this correction increase in prescription strength, they become thick in the center. Lenses with a smaller diameter can be manufactured to a reduced center thickness. Lenses of this type can be manufactured to larger diameters and edged down to smaller diameters because the edging process does not affect center thickness. However, when the lenses are reduced in diameter by edging, the finished edge thickness increases as the diameter decreases. The increase can be determined by the difference in curvature between the anterior and posterior surfaces.

The appearance and the optical performance of the lens can be improved by providing an aspheric surface of revolution on the lens. This approach can be used to produce lenses to larger diameters. For example, M. Jalie, "The Principles of Ophthalmic Lenses", Chapter 21, 4th Edition, London, The Association of British Dispensing Opticians (1988), describes the optical and cosmetic advantages achieved by lens designs in which one surface is aspheric (typically, but not necessarily, the anterior surface). It is generally desirable that optical performance not be sacrificed when a sphere, or a toroid when correcting for astigmatism, forms the posterior surface. It is also possible to prepare aspheric lenses in a semi-finished form (i.e., as oversized lens blanks), which can be fabricated to a final prescription using optical laboratory machinery.

Aspheric plus-power lenses for correction of hypermetropia that improve optical performance and cosmetic appearance can have spherical or toroidal posterior surfaces. Aspheric surfaces of revolution can be expressed as deformed spheroids, in which the departure from a sphere increases with the distance off-axis. For plus-power lenses (e.g., positive diopter lenses), this departure is in the direction of reduced curvature, below the constant curvature characteristic of spheroids, so that, for example, the center thicknesses of such lenses can be reduced. Examples using deformed spheroids include: lenses having distinct zones of differing curvature that are blended or smoothed in the regions connecting such zones (see, e.g., Bristol, U.S. Pat. No. 5,131,738); lenses having anterior surfaces expressed as surfaces of revolution of polynomials (see, e.g., Davis et al., U.S. Pat. No. 3,960,442); or lenses having anterior surfaces expressed as conicoids (see, e.g., Jalie, U.S. Pat. No. 4,289,387).

SUMMARY OF THE INVENTION

In one aspect, the invention features an ophthalmic lens. The lens includes a diameter D, an optically active central region of diameter $D_1$, $D_1$ being less than D, a border region between $D_1$ and D, and a rotationally symmetric anterior surface. The lens has a thickness $T_1$ at $D_1$ and a thickness T at D. The rotationally symmetric anterior surface is convex throughout the optically active central region and is concave in at least part of the border region between $D_1$ and D. The lens can be used in the correction of hypermetropia.

The lens is an aspheric lens. An aspheric lens has an aspheric surface. A surface is aspheric when it is generated by rotation of a symmetrical, noncircular, curve about its axis of symmetry.

In another aspect, the invention features an ophthalmic lens series. The series includes a plurality of aspheric lenses. For each lens in the series, $D_1$ can be constant, $T_1-T$ can be constant (e.g., between 0.0 mm and 0.2 mm, inclusive), and can have a power of between +0.25 diopter and +8.00 diopter, inclusive. The series can include a finished lens or a semi-finished lens blank.

In another aspect, the invention features a method of manufacturing a lens. The lens includes a diameter D, an optically-active central region of diameter $D_1$, $D_1$ being less than D, and a border region between $D_1$ and D. The lens has a thickness $T_1$ at $D_1$ and a thickness T at D. The method includes selecting a rotationally symmetric anterior surface, and forming a lens having the rotationally symmetric anterior surface and a posterior surface. The rotationally symmetric anterior surface is convex throughout the optically active central region and is concave in at least part of the border region between $D_1$ and D. The method can include finishing a semi-finished surface of the lens to form a lens having a finished prescription. In other embodiments, the method can include applying an abrasion-resistance coating or an anti-reflection coating to the lens. The selecting and the forming step can be repeated to generate a lens series including a plurality of lenses.

The optically active region within $D_1$ is a surface of revolution that can be described by a polynomial having only even terms, such as an eighth-order polynomial having only even terms. In certain embodiments, the optically active central region can be a surface of revolution described by a polynomial $$z_C(r) = Ar^2 + Br^4 + Cr^6 + Dr^8,$$

where r is a radial distance from an optical axis of the lens. A, B, C, and D, together, are chosen to improve the optical performance and reduce the thickness within the optically active region over those values afforded by a spherical surface.

The border region between $D_1$ and D is a surface of revolution that can be described by a third-order polynomial. In certain embodiments, the border region can be a surface of revolution described by a polynomial $$z_B(r) = Er^3 + Fr^2 + Gr + H,$$

where E, F, G, and H, together, are chosen to substantially smoothly connect the border region to the optically active region. In certain embodiments, A, B, C, D, E, F, G and H can be related by the equations $$Ar_1^2 + Br_1^4 + Cr_1^6 + Dr_1^8 = Er_1^3 + Fr_1^2 + Gr_1 + H;$$

$$Ar_2^2 + Br_2^4 + Cr_2^6 + Dr_2^8 = Er_2^3 + Fr_2^2 + Gr_2 + H;$$

$$Ar_3^2 + Br_3^4 + Cr_3^6 + Dr_3^8 = Er_3^3 + Fr_3^2 + Gr_3 + H; \text{ and}$$

$$Er_4^3 + Fr_4^2 + Gr_4 + H = Er_1^3 + Fr_1^2 + Gr_1 + H + s,$$

where $r_1$ is $D_1/2$, $r_4$ is $D/2$, and each of $r_2$ and $r_3$, independently, are between $R_1$ and $R_4$, and s is a numerical constant that establishes $T_1-T$. For example, $r_1$, $r_2$ and $r_3$ can be in the ratio of 1.00:0.96:0.92.

The difference $T_1-T$ can be equal to or greater than 0.0 mm and less than or equal to 0.2 mm. The lens can have a power of between +0.25 diopter and +8.00 diopter, inclusive (e.g., in 0.25 diopter increments). The lens can include a polymeric optical material, such as a thermoplastic (e.g., polycarbonate).

The rotationally symmetric anterior curve can be selected from an anterior base curve series. In other embodiments, the lens can further include a concave posterior surface selected from a rear base curve series. When the anterior curve is selected from an anterior base curve series, the lens can include a spherical posterior curve or a toroidal posterior curve. Accordingly, using an anterior base curve series, finished lenses and semi-finished lenses having substantially identical anterior optical surfaces can be manufactured.

The posterior curve can be applied to the posterior surface of a semi-finished lens, for example, using conventional optical laboratory machinery. Accordingly, a lens series covering the prescriptive range can be either an anterior base curve series, in which the posterior surface curvature is changed more frequently than the anterior surface curvature, or a posterior base curve series, in which the anterior surface curvature is changed more frequently than the posterior surface curvature.

The lenses can be reduced in thickness and weight and improved cosmetically while at the same time affording improved vision. The lenses can have satisfactory optical correction within the optically active region of the lenses over the prescriptive range. The lenses can be manufactured with diameters that are larger than the optically active region substantially without sacrificing optical correction within this region.

Within a lens series, the diameter of the optically active region can vary little, or not at all, with dioptric power. The outer diameters of lenses in a series can be constant or nearly constant for all powers. Preferably, the outer diameter of the plus-power lenses can be the same, or nearly the same, as the diameter of minus-power lenses that can be part of the total lens product line. The lens series can be designed to have a small and predictable difference in thickness between the lens at diameter $D_1$ and the lens edge at diameter D for all, or substantially all, of the lenses in the series.

In addition, the plus-power lenses of the series can have a constant outer diameter independent of prescriptive power, so that the lenses may benefit from the economies of common fixturing when being subjected to certain types of secondary manufacturing such as vacuum-applied anti-reflection coatings. Certain secondary manufacturing processes, such as applying liquid abrasion-resistance coatings to the lenses, can generate blemishes on the lens. The border region external to the optically active region of the lenses can contain the minor manufacturing blemishes that can later be removed from the lenses.

The plus-power lens series can result in improved economy of tooling and manufacture that results from using a common lens diameter over a product range that includes both plus-power and minus-power lenses. The productivity and economy of secondary manufacturing processes needing fixturing, such as the application of vacuum-deposited coatings that reduce surface reflections, can be improved.

The lenses can exhibit reduced chromatic aberration. At positions off axis, the aspheric anterior curve is closer in curvature to the posterior surface than an equivalent spherical anterior curve would be. This can reduce the prism angle between the two surfaces and, hence, the color dispersion or chromatic aberration for the aspheric lens compared to a spherical lens of equivalent power.

Other features or advantages of the present invention will be apparent from the following detailed description and from the claims.

BRIEF DESCRIPTIONS OF THE DRAWINGS

DESCRIPTION OF THE PREFERRED EMBODIMENTS

Figure 1:
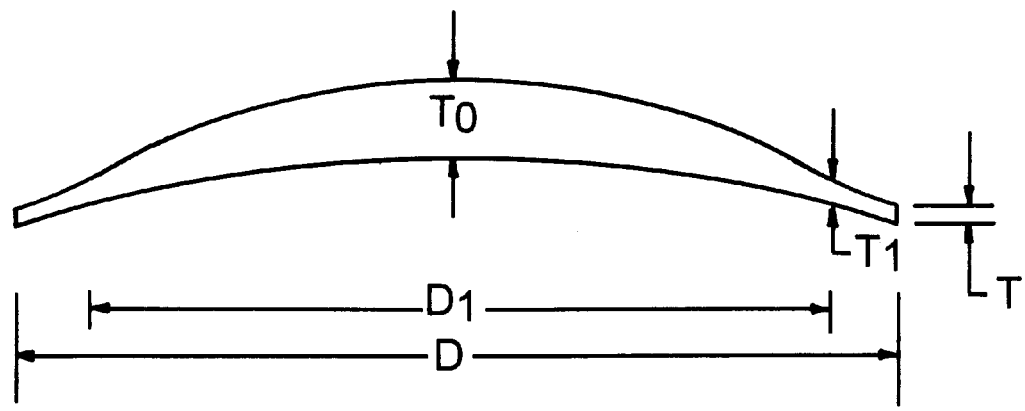
FIG. 1 is a schematic drawing depicting an axial cross-section of a finished lens having an improved aspheric anterior curve and a spherical posterior curve.

Referring to FIG. 1, an axial cross-section of a finished lens has an improved aspheric anterior curve. The lens can have a center thickness $T_0$, an overall diameter D, and an edge thickness T at D. The finished lens has an optically active central region with diameter $D_1$ and a thickness $T_1$ at $D_1$. The anterior surface within the optically active central region is convex throughout, i.e., the curvature of the surface within the optically active central region is concave downwards when the lens is oriented as shown in FIG. 1. The border region between $D_1$ and D decreases in lens thickness from $T_1$ at $D_1$ to T at D. The thickness difference $T_1-T$ can be established by the form of the anterior curve in this region. The form of the anterior curve in this region also provides for curvature which matches that of the optically active central region at $D_1$ and becomes partly concave as the diameter increases from $D_1$ to D. There is an inflection point on the anterior surface between $D_1$ and D so that the curvature of the anterior surface can be convex throughout the optically active central region within $D_1$ and be concave (e.g., having a curvature opposite that in the central region) in a portion of the border region lying between $D_1$ and D.

In the lens, D can be between about 50 mm and 90 millimeters, preferably between about 65 mm and 75 mm. $D_1$ can be between about 75 percent and 95 percent of D, preferably between about 85 and 90 percent of D. T can be between about 1.0 mm and 2.5 mm, preferably between about 1.0 mm and 2.0 mm. The difference $T_1-T$ can be between about 0 to 0.5 mm, preferably between about 0 and 0.2 mm. $T_0$ can follow from the other dimensions of the lens and from the difference between the front curve and the back curve.

In the optically active central region of diameter $D_1$, the anterior surface can be a surface of revolution described by the polynomial formula $$z_C(r)=Ar^2+Br^4+Cr^6+Dr^8,$$

and in the border region between $D_1$ and overall diameter D, the anterior surface in this region is a surface of revolution described by the polynomial formula $$z_B(r)=Er^3+Fr^2+Gr+H.$$

In the formulae $z_C(r)$ and $z_B(r)$, r is the radial distance from the optical axis. The sagittal distance from the anterior surface apex increases with increasing radial distance off-axis and is described as $z_C(r)$ within the optically active region and as $z_B(r)$ within the border region. The posterior curve on the posterior surface of the lens can be a sphere or a toroid.

The lens material can be, for example, an optical thermoplastic polymeric material of refractive index 1.586, such as a polycarbonate plastic (Lexan®). Each lens can have an overall diameter D of 73 mm, an optically active diameter $D_1$ of 65 mm, a lens thickness $T_1$ at a diameter of 65 mm equal to 1.2 mm, and a lens thickness difference, $T_1$–T, between 65 mm and 73 mm, equal to or less than 0.2 mm, i.e., an edge thickness that is at least 1.0 mm but no greater than 1.2 mm at 73 mm. Other suitable optical materials, including other optical polymers, both thermoplastic and thermoset in nature, can be used, and different values for the overall diameter D, the optically active diameter $D_1$, the edge thickness T, at D, and the difference in lens thickness, $T_1$–T, between $D_1$ and D can be chosen.

A number of optical materials and technologies exist for the manufacture of lenses. For example, lenses can be prepared from optical glass by grinding and polishing of the glass surfaces, from thermosetting plastic materials such as allyl diglycol carbonate bis (e.g., CR-39®) by casting and curing of a liquid monomer in a casting cell having a pair of optical-quality casting molds combined with means for properly spacing the molds and retaining the liquid monomer, or from thermoplastic materials such as polycarbonate (Lexan®) or polymethyl methacrylate (Plexiglas®) by injection molding the thermoplastic resin by using heat and pressure to form the optical object in a molding cavity containing suitable optical-quality molding surfaces. Lens molding is described, for example, in Maus et al. U.S. Pat. No. 4,828,769, Maus et al. U.S. Pat. No. 4,900,242, Weymouth U.S. Pat. No. 4,933,119, Weber U.S. Pat. No. 4,008,031, Weber U.S. Pat. No. 4,091,057, and Bakalar U.S. Pat. No. 4,664,854.

The coefficients A through D can be chosen to improve the optical performance and reduce the thickness within the optically active region over those values afforded by a spherical surface, using optical design techniques described in, e.g., M. Jalie, "The Principles of Ophthalmic Lenses", Chapter 21, 4th Edition, London: The Association of British Dispensing Opticians (1988). The coefficients E through H can be chosen to provide a border region that is substantially smoothly connected to the optically active region and that otherwise satisfies the objectives of our invention. In general, this may require an iterative process so that the dioptric power is correct, the optical performance in the optically active central region is satisfactory, the center thickness $T_0$ is as desired, and the difference in sag or thickness between $T_1$ and T is as desired.

The set of coefficients A through H is not completely independent. Once having chosen coefficients A through D for improved optical correction and reduced lens thickness over that provided by a spherical anterior surface, the coefficients E through H can be determined using the values of A through D as well as subsidiary border conditions that establish lens thickness T at the full lens diameter.

The aspheric anterior surface is required to be substantially smoothly connected at $D_1$ where the optically active central term and the border term meet. The surface is substantially smooth when these two expressions match within normally-expected manufacturing tolerances, such as those experienced when utilizing high-precision optical tooling technology. For example, at a tolerance of less than one micron (0.001 mm), errors can be both achievable in a tooling technology sense and immaterial in an optical performance sense.

The substantially smoothly connected condition can be met in a number of ways. For example, trial solutions for the coefficients E through H of $z_B(r)$ in combination with a graphical means of establishing that $z_B(r)$ is acceptably matched to $z_C(r)$ can be used. Other means, such as solving sets of simultaneous linear equations for E through H, can be utilized as well.

Figure 2:
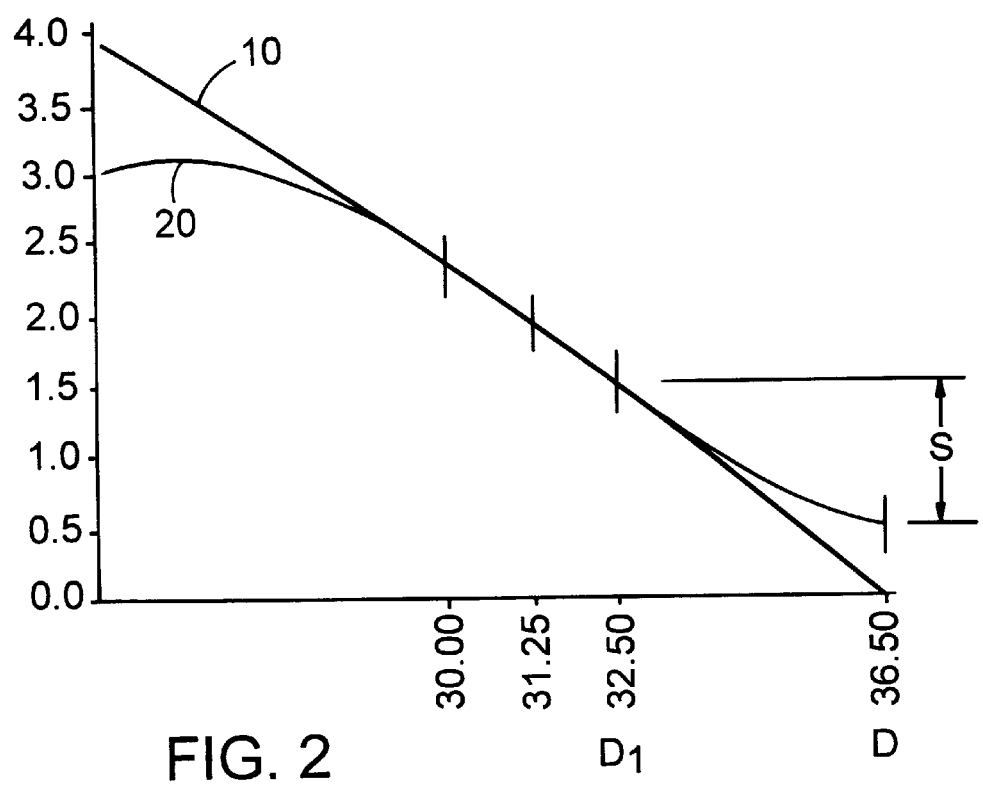
FIG. 2 is a schematic drawing depicting a portion of a curve based on a polynomial describing the optically active region within $D_1$ and a portion of a curve based on the polynomial describing the border region bounded by $D_1$ and D in the region of $D_1$.

FIG. 2 illustrates one-method of solving for acceptable values for the coefficients E through H. Referring to FIG. 2, curve 10 represents a mathematical solution for the surface description for an optically active central region, and curve 20 represents a mathematical solution for the surface description for a border region. To arrive at curve 10 and curve 20, the polynomials are made to be substantially equal in value at a number of points in the region of $D_1$ (e.g., substantially smoothly connected) and the border region polynomial is further made to have a fixed difference in height between $D_1$ and D. The optically active central region ends at diameter $D_1$, shown in FIG. 2 as r equal to $D_1/2$ (r=32.50 mm). The solution for the border region is matched to the solution for the optically active central region at three points (r=30.00 mm, r=31.25 mm and r=32.50 mm) in the region of $D_1/2$ and within the aforementioned one micron tolerance acceptability, and is further determined to have a sagittal (height) difference, s, between $D_1/2$ (32.50 mm) and D/2 (36.50 mm) of 1.00 mm within the one micron tolerance acceptability.

Without further elaboration, it is believed that one skilled in the art can, based on the description herein, utilize the present invention to its fullest extent. The following examples are, therefore, to be construed as merely representative, and not limitive, of the remainder of the disclosure. All publications cited in this disclosure are incorporated by reference.

EXAMPLES

Example 1

A +4.25 diopter spherical lens of 73 mm diameter can be made having an anterior radius of 73.0 mm and a posterior radius of 145.5 mm. If such a lens has a center thickness of 6.13 mm, it will have a rear vertex power of +4.25 diopters and an edge thickness of 1.0 mm. At a reduced diameter of 65 mm, the lens thickness of this spherical lens will be 2.2 mm, or 1.2 mm thicker than at the edge. This lens will further have, as optical performance parameters, approximately 550 microradians of root-mean-square (RMS) angular image blur at 20° off-axis, and approximately 6.7 percent of rectilinear distortion at this off-axis field of the lens.

An improved aspheric lens of sphere power +4.25 diopter having enhanced optics and reduced center thickness and flat plate thickness over that provided by the spherical lens above, was prepared using an identical posterior radius as the spherical lens. The optical performance parameters for the aspheric lens at 20° off-axis were an angular blur size of 350 microradians and rectilinear distortion of 4 percent. Lens center thickness was 4.44 mm, the lens thickness at a diameter of 65 mm was 1.20 mm, and lens edge thickness at the full diameter of 73 mm was 1.17 mm.

The aspheric lens is described by the following anterior-surface equations:

For r less than or equal to 32.5 mm, $$z_C(r) = Ar^2 + Br^4 + Cr^6 + Dr^8,$$

where
 $A = 6.90414 \times 10^{-3}$,
 $B = -4.03402 \times 10^{-7}$,
 $C = 6.53904 \times 10^{-11}$, and $D=-1.49881\times10^{-15}$.

For r greater than 32.5 mm and r less than or equal to 36.5 mm, $$z_B(r)=Er^3+Fr^2+Gr+H,$$

where $E=-5.30464\times10^{-3}$,
$F=5.03189\times10^{-1}$,
$G=-1.55270\times10^{+1}$, and
$H=1.61498\times10^{+2}$.

The numerical values for the coefficients E through H follow from the relationships between the coefficients A through D and E through H, according to the substantially smoothly connected condition described above and illustrated in FIG. 2. A subsidiary calculation shows that, when the posterior radius $R_2$ was 145.5 mm and $T_1-T$ was 0.03 mm, s was 1.0015 mm.

Compared to the spherical lens described above, the aspheric lens had a center thickness reduced from 6.13 mm to 4.44 mm (28 percent), a thickness at a diameter of 65 mm reduced from 2.2 mm to 1.2 mm (44 percent), an angular image blur size reduced from 550 microradians to 350 microradians (36 percent), and its rectilinear distortion reduced from 6.7 percent to 4.0 percent (40 percent).

Example 2

A +2.00 diopter spherical lens of 73 mm diameter can be made having an anterior radius of 111.8 mm and a posterior radius of 177.7 mm. If such a lens has a center thickness of 3.34 mm, it will have a rear vertex power of +2.00 diopters and an edge thickness of 1.0 mm. At a reduced diameter of 65 mm, the lens thickness of this spherical lens will be 1.51 mm, or 0.5 mm thicker than at the edge. This lens will further have, as optical performance parameters, approximately 610 microradians of RMS angular image blur at 20° off-axis, and approximately 3.1% of rectilinear distortion at this off-axis angle.

An aspheric lens of sphere power +2.00 diopter having enhanced optics and reduced center thickness and flat plate thickness over that provided by the spherical lens was prepared using an identical posterior radius and the aforementioned methodology for improvement. The optical improvements at 20° off-axis were a reduced RMS blur size of 350 microradians and a reduced distortion of 1.7 percent. The lens center thickness was 2.61 mm, lens thickness at a diameter of 65 mm was 1.20 mm, and lens edge thickness at the full diameter of 73 mm was 1.00 mm.

The aspheric lens is described by the equations of the general form of anterior-surface equations as in Example 1, where $A=4.47051\times10^{-3}$,
$B=-4.06431\times10^{-7}$,
$C=1.27377\times10^{-10}$,
$D=-2.30962\times10^{-14}$,
$E=-5.38320\times10^{-4}$,
$F=5.37962\times10^{-2}$,
$G=-1.53725\times10^{+0}$, and
$H=1.60024\times10^{+1}$.

The numerical values for the coefficients E through H follow from the relationships between the coefficients A through D and E through H, according to the substantially smoothly connected condition described above and illustrated in FIG. 2. A subsidiary calculation shows that, when the posterior radius $R_2$ is 177.7 mm and $T_1-T$ was 0.20 mm, s was 1.0021 mm.

Compared to the spherical lens described above, the aspheric lens had its center thickness reduced from 3.34 mm to 2.61 mm (22 percent), its thickness at a diameter of 65 mm reduced from 1.51 mm to 1.20 mm (21 percent), its angular image blur size reduced from 610 microradians to 350 microradians (43 percent), and its rectilinear distortion reduced from 3.1 percent to 1.7 percent (45 percent).

Example 3

The approach described in Examples 1 and 2 can be used to develop a comprehensive solution to a plus-power lens series. An ophthalmic lens series, in increments of 0.25 diopter of sphere power, can be manufactured either in a manner in which the anterior curve is changed more frequently than the posterior curve (e.g., a posterior base curve series), or in a manner in which the posterior curve is changed more frequently than the anterior curve (e.g., an anterior base curve series). Alternatively, totally unique anterior and posterior curves for each increment of dioptric power can be used. Either series results in desired optical accuracy, performance, and lens geometry (e.g., lens thicknesses at center and edge, lens "bulge" or flat plate thickness over the central optically-corrected region). A series covering a full prescriptive range can include 32 lenses or up to about 288 lenses (e.g., 32 spherical powers and 9 cylindrical powers for each spherical power). Smaller series covering selected prescriptions can also be made.

Accordingly, a sequence of aspheric anterior surfaces made using a thermoplastic optical polymer of refractive index 1.586, and incorporating the aspheric lenses of Examples 1 and 2, using the equations that describe the anterior central and border regions and the set of relationships for the coefficients A through H that describe the border details described above, is set out in Tables 1A and 1B.

TABLE 1A

| Central Radius (mm) | A | B | C | D |
|---|---|---|---|---|
| 111.814 | $4.47015\times10^{-3}$ | $-4.06431\times10^{-7}$ | $1.27377\times10^{-10}$ | $-2.30962\times10^{-14}$ |
| 106.935 | $4.67472\times10^{-3}$ | $-4.22137\times10^{-7}$ | $1.29454\times10^{-10}$ | $-2.30258\times10^{-14}$ |
| 102.269 | $4.88821\times10^{-3}$ | $-4.33063\times10^{-7}$ | $1.29479\times10^{-10}$ | $-2.24574\times10^{-14}$ |
| 98.158 | $5.09430\times10^{-3}$ | $-4.38972\times10^{-7}$ | $1.27653\times10^{-10}$ | $-2.14814\times10^{-14}$ |
| 94.364 | $5.29819\times10^{-3}$ | $-4.41085\times10^{-7}$ | $1.24225\times10^{-10}$ | $-2.01288\times10^{-14}$ |
| 90.847 | $5.50358\times10^{-3}$ | $-4.40078\times10^{-7}$ | $1.19392\times10^{-10}$ | $-1.84400\times10^{-14}$ |
| 87.589 | $5.70853\times10^{-3}$ | $-4.36635\times10^{-7}$ | $1.13380\times10^{-10}$ | $-1.64663\times10^{-14}$ |
| 84.682 | $5.90471\times10^{-3}$ | $-4.31688\times10^{-7}$ | $1.06704\times10^{-10}$ | $-1.43477\times10^{-14}$ |
| 81.853 | $6.10901\times10^{-3}$ | $-4.25470\times10^{-7}$ | $9.89917\times10^{-11}$ | $-1.19453\times10^{-14}$ |

TABLE 1A-continued

| Central Radius (mm) | A | B | C | D |
|---|---|---|---|---|
| 79.294 | $6.30641 \times 10^{-3}$ | $-4.19051 \times 10^{-7}$ | $9.09925 \times 10^{-11}$ | $-9.47416 \times 10^{-15}$ |
| 76.803 | $6.51117 \times 10^{-3}$ | $-4.12623 \times 10^{-7}$ | $8.23265 \times 10^{-11}$ | $-6.79794 \times 10^{-15}$ |
| 74.435 | $6.72480 \times 10^{-3}$ | $-4.06891 \times 10^{-7}$ | $7.31051 \times 10^{-11}$ | $-3.93009 \times 10^{-15}$ |
| 72.435 | $6.90414 \times 10^{-3}$ | $-4.03402 \times 10^{-7}$ | $6.53904 \times 10^{-11}$ | $-1.49881 \times 10^{-15}$ |
| 70.432 | $7.10065 \times 10^{-3}$ | $-4.01537 \times 10^{-7}$ | $5.71367 \times 10^{-11}$ | $1.15314 \times 10^{-15}$ |
| 68.537 | $7.29705 \times 10^{-3}$ | $-4.02302 \times 10^{-7}$ | $4.92792 \times 10^{-11}$ | $3.75321 \times 10^{-15}$ |
| 66.818 | $7.48493 \times 10^{-3}$ | $-4.06045 \times 10^{-7}$ | $4.22910 \times 10^{-11}$ | $6.15761 \times 10^{-15}$ |
| 65.111 | $7.68128 \times 10^{-3}$ | $-4.13682 \times 10^{-7}$ | $3.57174 \times 10^{-11}$ | $8.54641 \times 10^{-15}$ |

TABLE 1B

| Central Radius (mm) | E | F | G | H |
|---|---|---|---|---|
| 111.814 | $-5.38320 \times 10^{-4}$ | $5.37962 \times 10^{-2}$ | $-1.53725 \times 10^{0}$ | $1.60024 \times 10^{1}$ |
| 106.935 | $-9.12000 \times 10^{-4}$ | $8.90210 \times 10^{-2}$ | $-2.63228 \times 10^{0}$ | $2.74173 \times 10^{1}$ |
| 102.269 | $-1.29696 \times 10^{-3}$ | $1.25297 \times 10^{-1}$ | $-3.75891 \times 10^{0}$ | $3.91464 \times 10^{1}$ |
| 98.158 | $-1.69784 \times 10^{-3}$ | $1.63118 \times 10^{-1}$ | $-4.93506 \times 10^{0}$ | $5.14128 \times 10^{1}$ |
| 94.364 | $-2.09152 \times 10^{-3}$ | $2.00245 \times 10^{-1}$ | $-6.08992 \times 10^{0}$ | $6.34361 \times 10^{1}$ |
| 90.847 | $-2.50328 \times 10^{-3}$ | $2.39068 \times 10^{-1}$ | $-7.29683 \times 10^{0}$ | $7.60049 \times 10^{1}$ |
| 87.589 | $-2.90488 \times 10^{-3}$ | $2.76956 \times 10^{-1}$ | $-8.47509 \times 10^{0}$ | $8.82806 \times 10^{1}$ |
| 84.682 | $-3.30056 \times 10^{-3}$ | $3.14209 \times 10^{-1}$ | $-9.63152 \times 10^{0}$ | $1.00305 \times 10^{2}$ |
| 81.853 | $-3.71488 \times 10^{-3}$ | $3.45298 \times 10^{-1}$ | $-1.08476 \times 10^{1}$ | $1.12978 \times 10^{2}$ |
| 79.294 | $-4.13064 \times 10^{-3}$ | $3.92525 \times 10^{-1}$ | $-1.20682 \times 10^{1}$ | $1.25698 \times 10^{2}$ |
| 76.803 | $-4.52288 \times 10^{-3}$ | $4.29503 \times 10^{-1}$ | $-1.32170 \times 10^{1}$ | $1.37655 \times 10^{2}$ |
| 74.435 | $-4.95240 \times 10^{-3}$ | $4.70000 \times 10^{-1}$ | $-1.44757 \times 10^{1}$ | $1.50762 \times 10^{2}$ |
| 72.435 | $-5.30464 \times 10^{-3}$ | $5.03189 \times 10^{-1}$ | $-1.55270 \times 10^{1}$ | $1.61498 \times 10^{2}$ |
| 70.432 | $-5.67880 \times 10^{-3}$ | $5.38430 \times 10^{-1}$ | $-1.66011 \times 10^{1}$ | $1.72881 \times 10^{2}$ |
| 68.537 | $-6.05384 \times 10^{-3}$ | $5.73782 \times 10^{-1}$ | $-1.77000 \times 10^{1}$ | $1.84328 \times 10^{2}$ |
| 66.818 | $-6.39112 \times 10^{-3}$ | $6.05568 \times 10^{-1}$ | $-1.86872 \times 10^{1}$ | $1.94609 \times 10^{2}$ |
| 65.111 | $-6.72176 \times 10^{-3}$ | $6.36679 \times 10^{-1}$ | $-1.96518 \times 10^{1}$ | $2.04642 \times 10^{2}$ |

Examples utilizing selected anterior surfaces from Tables 1A and 1B and appropriate posterior spheric surfaces, in describing an anterior base curve series, are set out in Table 2, including the lens of Example 1. P (D) is the power of the lens in diopters, $R_1$ is the central radius of the anterior surface, $R_2$ is the radius of the posterior surface, and $T_0$ is the center thickness of the lens. The examples in Table 2 represent members of an anterior base curve series in which the lens thickness at 65 mm ($T_1(65)$) was uniformly 1.2 mm, and the lens edge thickness at the 73 mm diameter (T(73)) was not less than 1.0 mm and not more than 1.2 mm.

TABLE 2

| Example | P(D) | $R_1$ | $R_2$ | $T_0$ | $T_1(65)$ | T(73) |
|---|---|---|---|---|---|---|
| I | 4.25 | 72.4 | 145.5 | 4.44 | 1.20 | 1.17 |
| II | 4.50 | 72.4 | 154.9 | 4.67 | 1.20 | 1.11 |
| III | 4.75 | 72.4 | 165.5 | 4.90 | 1.20 | 1.05 |
| IV | 5.00 | 72.4 | 177.7 | 5.12 | 1.20 | 1.00 |

Figure 3:
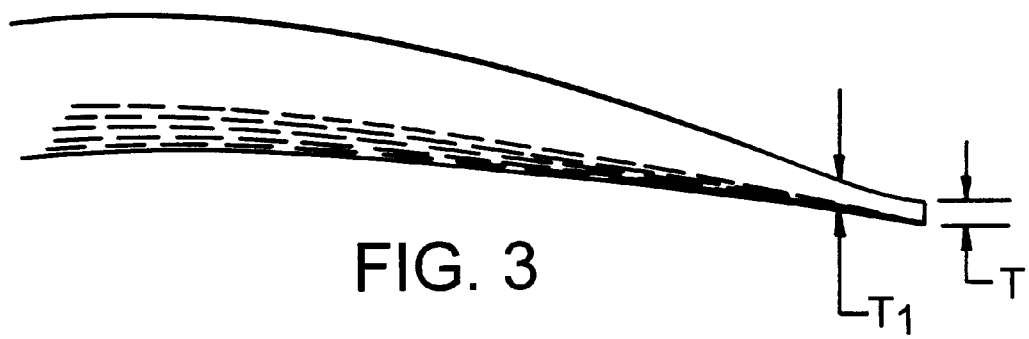
FIG. 3 is a schematic drawing depicting a series of posterior curves combined with a single anterior curve that is representative of an anterior base curve series.

FIG. 3 depicts a series of posterior curves, in combination with a common anterior curve, representative of an anterior base curve series. The anterior curve has an outer diameter D and a lesser diameter $D_1$ describing the optically active region of lenses made using these surfaces. The border region between $D_1$ and D is substantially smoothly connected to the optically active region within $D_1$. There is a sagittal (height) difference between the values at $D_1$ and D, described earlier as $s=z(D_1/2-D/2)$, for the anterior curve. The series of posterior curves making up this anterior base curve series have a common value for T, but values for $T_1$ that vary between a minimum of 1.00 mm and a maximum of 1.20 mm.

Examples utilizing selected anterior surfaces from Tables 1A and 1B and appropriate posterior spheric surfaces, in describing a posterior base curve series, are set out in Table 3, including the lens of Example 2. P (D) is the power of the lens in diopters, $R_1$ is the central radius of the anterior surface, $R_2$ is the radius of the posterior surface, and $T_0$ is the center thickness of the lens. The examples in Table 3 represent member of an anterior base curve series in which the lens thickness at 65 mm ($T_1(65)$) was uniformly 1.2 mm, and the lens edge thickness at the 73 mm diameter (T(73)) was no less than 1.0 mm nor no more than 1.2 mm.

TABLE 3

| Example | P(D) | $R_1$ | $R_2$ | $T_0$ | $T_1(65)$ | T(73) |
|---|---|---|---|---|---|---|
| I | 2.00 | 111.8 | 177.7 | 2.61 | 1.20 | 1.00 |
| II | 2.50 | 102.3 | 177.7 | 3.01 | 1.20 | 1.00 |
| III | 2.75 | 98.1 | 177.7 | 3.22 | 1.20 | 1.00 |
| IV | 3.00 | 94.4 | 177.7 | 3.43 | 1.20 | 1.00 |
| V | 4.00 | 81.8 | 177.7 | 4.28 | 1.20 | 1.00 |
| VI | 5.00 | 72.4 | 177.7 | 5.12 | 1.20 | 1.00 |

Figure 4:
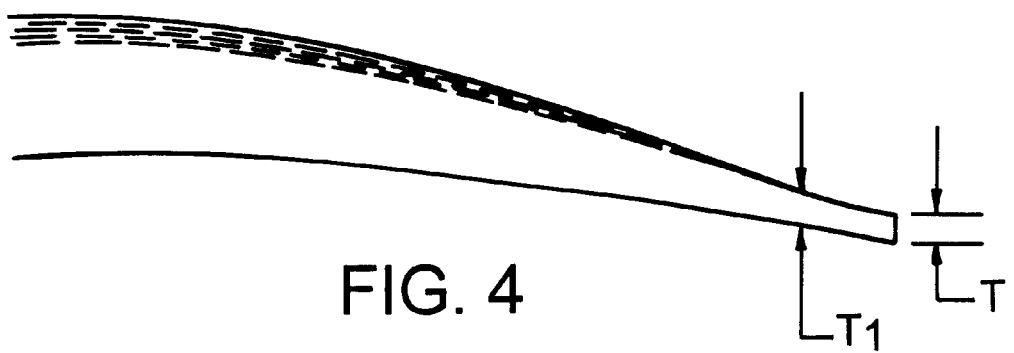
FIG. 4 is a schematic drawing depicting a series of anterior curves combined with a single posterior curve that is representative of a posterior base curve series.

FIG. 4 depicts a series of ant anterior curves, in combination with a common posterior curve, representative of a posterior base curve series. The anterior curves have in common an outer diameter D and a lesser diameter $D_1$ describing the optically active region of lenses made using these surfaces. The border region between $D_1$ and D is substantially smoothly connected to the optically active region within $D_1$. There is a common sagittal (height) difference between the values at $D_1$ and D, described earlier as $s=z(D_1/2-D/2)$, for these anterior curves. The series of anterior curves making up this posterior base curve series have a common value of 1.20 mm for $T_1$, and a common value of 1.00 mm for T.

Other embodiments are within the claims. For example, while the examples utilize polycarbonate thermoplastic polymer of refractive index 1.586 to produce lenses of 73 mm diameter having preferred edge thicknesses in the range of 1.0 mm to 1.2 mm while at the same time having preferred thicknesses of 1.2 mm at the boundary separating the optically active zone of diameter 65 mm from the border zone, the principles of the invention can be used to prepare improved plus-power aspheric ophthalmic lenses of differing optically active diameters and overall diameters using any suitable ophthalmic optical material, including thermoset or thermoplastic polymeric materials, combined with a suitable set of manufacturing processes that accurately replicate the mathematical forms of the surface descriptions provided.

What is claimed is:

1. An ophthalmic lens comprising a diameter D, an optically active central region of diameter $D_1$, $D_1$ being less than D, a border region between $D_1$ and D, and a rotationally symmetric anterior surface, said rotationally symmetric anterior surface being convex throughout the optically active central region and being concave in at least part of the border region between $D_1$ and D, wherein the lens has a thickness $T_1$ at $D_1$ and a thickness T at D, and $T_1-T$ is between 0.0 mm and 0.2 mm, inclusive.

2. The ophthalmic lens of claim 1, wherein the lens comprises a polymeric optical material.

3. The ophthalmic lens of claim 2, wherein the polymeric optical material comprises a thermoplastic.

4. The ophthalmic lens of claim 3, wherein the thermoplastic comprises a polycarbonate.

5. The ophthalmic lens of claim 1, wherein the lens has a power of between +0.25 diopter and +8.00 diopter, inclusive.

6. The ophthalmic lens of claim 1, wherein the optically active central region is a surface of revolution described by a polynomial $$z_C(r)=Ar^2+Br^4+Cr^6+Dr^8,$$

wherein r is a radial distance from an optical axis of the lens and A, B, C, and D, together, are chosen to improve the optical performance and reduce the thickness within the optically active region over those values afforded by a spherical surface.

7. The ophthalmic lens of claim 6, wherein the border region is a surface of revolution described by a polynomial $$z_B(r)=Er^3+Fr^2+Gr+H,$$

wherein E, F, G, and H, together, are chosen to substantially smoothly connect the border region to the optically active region.

8. The ophthalmic lens of claim 7, wherein A, B, C, D, E, F, G and H are related by the equations $$Ar_1^2+Br_1^4+Cr_1^6+Dr_1^8=Er_1^3+Fr_1^2+Gr_1+H;$$

$$Ar_2^2+Br_2^4+Cr_2^6+Dr_2^8=Er_2^3+Fr_2^2+Gr_2+H;$$

$$Ar_3^2+Br_3^4+Cr_3^6+Dr_3^8=Er_3^3+Fr_3^2+Gr_3+H; \text{ and}$$

$$Er_4^3+Fr_4^2+Gr_4+H=Er_1^3+Fr_1^2+Gr_1+H+s,$$

where $r_1$ is $D_1/2$, $r_4$ is $D/2$, and each of $r_2$ and $r_3$, independently, are between $r_1$ and $r_4$, and s is a numerical constant that establishes $T_1-T$.

9. The ophthalmic lens of claim 8, wherein $r_1$, $r_2$ and $r_3$ are in the ratio of 1.00:0.96 0.92.

10. An ophthalmic lens series comprising:
   a plurality of lenses, each lens comprising a diameter D, an optically active central region of diameter $D_1$, $D_1$ being less than D, a border region between $D_1$ and D, and a rotationally symmetric anterior surface, said rotationally symmetric anterior surface being convex throughout the optically active central region and being concave in at least Start of the border region between $D_1$ and D, wherein each lens has a thickness $T_1$ at $D_1$ and a thickness T at D, and $D_1$ is constant for each lens in the series.

11. The ophthalmic lens series of claim 10, wherein for each lens $T_1-T$ is constant.

12. The ophthalmic lens series of claim 10, wherein $T_1-T$ is between 0.0 mm and 0.2 mm, inclusive.

13. The ophthalmic lens series of claim 10, wherein the series includes a finished lens.

14. The ophthalmic lens series of claim 10, wherein the series includes a semi-finished lens blank.

15. The ophthalmic lens series of claim 10, wherein each lens has a power of between +0.25 diopter and +8.00 diopter, inclusive.

16. The ophthalmic lens series of claim 10, wherein the rotationally symmetric anterior curve is selected from an anterior base curve series.

17. The ophthalmic lens series of claim 16, wherein the lens includes a spherical posterior curve or a toroidal posterior curve.

18. The ophthalmic lens series of claim 10, wherein each lens further comprises a concave posterior surface selected from a rear base curve series.

19. A method of manufacturing a lens comprising a diameter D, an optically active central region of diameter $D_1$, $D_1$ being less than D, a border region between $D_1$ and D, the lens having a thickness $T_1$ at $D_1$ and a thickness T at D, the method comprising:
   selecting a rotationally symmetric anterior surface, said rotationally symmetric anterior surface being convex throughout the optically active central region and being concave in at least part of the border region between $D_1$ and D; and
   forming a lens having the rotationally symmetric anterior surface and a posterior surface, the lens having a power of between +0.25 diopter and +8.00 diopter, inclusive, D being between 65 and 75 mm and $D_1$ being between 85 and 90 percent of D, regardless of lens power.

20. The method of claim 19, herein $T_1-T$ is equal to or greater than 0.0 mm and less than or equal to 0.2 mm.

21. The method of claim 19, wherein the lens comprises a polymeric optical material.

22. The method of claim 19, further comprising finishing a semi-finished surface of the lens to form a lens having a finished prescription.

23. The method of claim 19, further comprising applying an abrasion-resistance coating to the lens.

24. The method of claim 19, further comprising applying an anti-reflection coating to the lens.

25. The method of claim 19, wherein the optically active central region is a surface of revolution described by a polynomial $$z_C(r) = Ar^2 + Br^4 + Cr^6 + Dr^8,$$

wherein r is a radial distance from an optical axis of the lens and A, B, C, and D, together, are chosen to improve the optical performance and reduce the thickness within the optically active region over those values afforded by a spherical surface.

26. The method of claim 25, wherein the border region is a surface of revolution described by a polynomial $$z_B(r) = Er^3 + Fr^2 + Gr + H,$$

wherein E, F, G, and H, together, are chosen to substantially smoothly connect the border region to the optically active region.

27. The method of claim 26, wherein A, B, C, D, E, F, G and H are related by the equations $$Ar_1^2 + Br_1^4 + Cr_1^6 + Dr_1^8 = Er_1^3 + Fr_1^2 + Gr_1 + H;$$

$$Ar_2^2 + Br_2^4 + Cr_2^6 + Dr_2^8 = Er_2^3 + Fr_2^2 + Gr_2 + H;$$

$$Ar_3^2 + Br_3^4 + Cr_3^6 + Dr_3^8 = Er_3^3 + Fr_3^2 + Gr_3 + H; \text{ and}$$

$$Er_4^3 + Fr_4^2 + Gr_4 + H = Er_1^3 + Fr_1^2 + Gr_1 + H + s,$$

where $r_1$ is $D_1/2$, $r_4$ is $D/2$, and each of $r_2$ and $r_3$, independently, are between $r_1$ and $r_4$, and s is a numerical constant that establishes $T_1 - T$.

28. The method of claim 27, wherein $r_1$, $r_2$ and $r_3$ are in the ratio of 1.00:0.96:0.92.

29. A method of manufacturing a lens series comprising a plurality of lenses comprising a diameter D, an optically active central region of diameter $D_1$, $D_1$ being less than D, a border region between $D_1$ and D, the lens having a thickness $T_1$ at $D_1$ and a thickness T at D, the method comprising:
  selecting a rotationally symmetric anterior surface, said rotationally symmetric anterior surface being convex throughout the optically active central region and being concave in at least part of the border region between $D_1$ and D; and
  forming a lens having the rotationally symmetric anterior surface and a posterior surface,
  wherein the selecting and the forming step are repeated to generate the lens series and $D_1$ is constant for each lens in the series.

30. The method of claim 29, wherein for each lens $T_1 - T$ is constant.

31. The method of claim 29, wherein the series includes a finished lens.

32. The method of claim 29, wherein the series includes a semi-finished lens blank.

33. The method of claim 29, wherein the lens has a power of between +0.25 diopter and +8.00 diopter, inclusive.

34. The method of claim 29, wherein the optically active central region is a surface of revolution described by a polynomial $$z_C(r) = Ar^2 + Br^4 + Cr^6 + Dr^8,$$

wherein r is a radial distance from an optical axis of the lens and A, B, C, and D, together, are chosen to improve the optical performance and reduce the thickness within the optically active region over those values afforded by a spherical surface.

35. The method of claim 34, wherein the border region is a surface of revolution described by a polynomial $$z_B(r) = Er^3 + Fr^2 + Gr + H,$$

wherein E, F, G, and H, together, are chosen to substantially smoothly connect the border region to the optically active region.

36. The method of claim 35, wherein A, B, C, D, E, F, G and H are related by the equations $$Ar_1^2 + Br_1^4 + Cr_1^6 + Dr_1^8 = Er_1^3 + Fr_1^2 + Gr_1 + H;$$

$$Ar_2^2 + Br_2^4 + Cr_2^6 + Dr_2^8 = Er_2^3 + Fr_2^2 + Gr_2 + H;$$

$$Ar_3^2 + Br_3^4 + Cr_3^6 + Dr_3^8 = Er_3^3 + Fr_3^2 + Gr_3 + H; \text{ and}$$

$$Er_4^3 + Fr_4^2 + Gr_4 + H = Er_1^3 + Fr_1^2 + Gr_1 + H + s,$$

where $r_1$ is $D_1/2$, $r_4$ is $D/2$, and each of $r_2$ and $r_3$, independently, are between $r_1$ and $r_4$, and s is a numerical constant that establishes $T_1 - T$.

37. The method of claim 36, wherein $r_1$, $r_2$ and $r_3$ are in the ratio of 1.00:0.96:0.92.

38. The method of claim 29, wherein $T_1 - T$ is between 0.0 mm and 0.2 mm, inclusive.

39. An ophthalmic lens comprising a diameter D, an optically active central region of diameter $D_1$, $D_1$ being less than D, a border region between $D_1$ and D, and a rotationally symmetric anterior surface, said rotationally symmetric anterior surface being convex throughout the optically active central region and being concave in at least part of the border region between $D_1$ and D, wherein the lens has a thickness $T_1$ at $D_1$ and a thickness T at D and
  the optically active central region is a surface of revolution described by a polynomial $$z_C(r) = Ar^2 + Br^4 + Cr^6 + Dr^8,$$

wherein r is a radial distance from an optical axis of the lens and A, B, C, and D, together, are chosen to improve the optical performance and reduce the thickness within the optically active region over those values afforded by a spherical surface.

40. The ophthalmic lens of claim 39, wherein the border region is a surface of revolution described by a polynomial $$z_B(r) = Er^3 + Fr^2 + Gr + H,$$

wherein E, F, G, and H, together, are chosen to substantially smoothly connect the border region to the optically active region.

41. The ophthalmic lens of claim 40, wherein A, B, C, D, E, F, G and H are related by the equations $$Ar_1^2 + Br_1^4 + Cr_1^6 + Dr_1^8 = Er_1^3 + Fr_1^2 + Gr_1 + H;$$

$$Ar_2^2 + Br_2^4 + Cr_2^6 + Dr_2^8 = Er_2^3 + Fr_2^2 + Gr_2 + H;$$

$$Ar_3^2 + Br_3^4 + Cr_3^6 + Dr_3^8 = Er_3^3 + Fr_3^2 + Gr_3 + H; \text{ and}$$

$$Er_4^3 + Fr_4^2 + Gr_4 + H = Er_1^3 + Fr_1^2 + Gr_1 + H + s,$$

where $r_1$ is $D_1/2$, $r_4$ is $D/2$, and each of $r_2$ and $r_3$, independently, are between $r_1$ and $r_4$, and s is a numerical constant that establishes $T_1 - T$.

42. The ophthalmic lens of claim 41, wherein $r_1$, $r_2$ and $r_3$ are in the ratio of 1.00:0.96:0.92.

43. The ophthalmic lens series of claim 39, wherein $T_1 - T$ is between 0.0 mm and 0.2 mm, inclusive.

44. The ophthalmic lens of claim 39, wherein the lens has a power of between +0.25 diopter and +8.00 diopter, inclusive.

45. The ophthalmic lens of claim 44, wherein D is between 65 and 75 mm and $D_1$ is between 85 and 90 percent of D regardless of lens power.

46. An ophthalmic lens comprising a diameter D, an optically active central region of diameter $D_1$, $D_1$ being less than D, a border region between $D_1$ and D, and a rotationally symmetric anterior surface, said rotationally symmetric anterior surface being convex throughout the optically active central region and being concave in at least part of the border region between $D_1$ and D, wherein the lens has a thickness $T_1$ at $D_1$ and a thickness T at D, the lens has a power of between +0.25 diopter and +8.00 diopter, inclusive, and D is between 65 and 75 mm and $D_1$ is between 85 and 90 percent of D, regardless of lens power.

47. The lens of claim 46, wherein the optically active central region is a surface of revolution described by a polynomial $$z_C(r) = Ar^2 + Br^4 + Cr^6 + Dr^8,$$

wherein r is a radial distance from an optical axis of the lens A, B, C, and D, together, are chosen to improve the optical performance and reduce the thickness within the optically active region over those values afforded by a spherical surface.

48. The ophthalmic lens of claim 47, wherein the border region is a surface of revolution described by a polynomial $$z_B(r) = Er^3 + Fr^2 + Gr + H,$$

wherein E, F, G, and H, together, are chosen to substantially smoothly connect the border region to the optically active region.

49. The ophthalmic lens of claim 47, wherein A, B, C, D, E, F, G and H are related by the equations $$Ar_1^2 + Br_1^4 + Cr_1^6 + Dr_1^8 = Er_1^3 + Fr_1^2 + Gr_1 + H;$$

$$Ar_2^2 + Br_2^4 + Cr_2^6 + Dr_2^8 = Er_2^3 + Fr_2^2 + Gr_2 + H;$$

$$Ar_3^2 + Br_3^4 + Cr_3^6 + Dr_3^8 = Er_3^3 + Fr_3^2 + Gr_3 + H; \text{ and}$$

$$Er_4^3 + Fr_4^2 + Gr_4 + H = Er_1^3 + Fr_1^2 + Gr_1 + H + s,$$

where $r_1$ is $D_1/2$, $r_4$ is $D/2$, and each of $r_2$ and $r_3$, independently, are between $r_1$ and $r_4$, and s is a numerical constant that establishes $T_1 - T$.

50. The ophthalmic lens of claim 49, wherein $r_1$, $r_2$ and $r_3$ are in the ratio of 1.00:0.96:0.92.

51. The ophthalmic lens series of claim 49, wherein $T_1 - T$ is between 0.0 mm and 0.2 mm, inclusive.

* * * * *